(12) United States Patent
Goldberg et al.

(10) Patent No.: US 9,329,792 B2
(45) Date of Patent: May 3, 2016

(54) STORAGE THIN PROVISIONING AND SPACE RECLAMATION

(71) Applicant: INTERNATIONAL BUSINESS MACHINES CORPORATION, Armonk, NY (US)

(72) Inventors: Itzhack Goldberg, Haifa (IL); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 14/154,380

(22) Filed: Jan. 14, 2014

(65) Prior Publication Data

US 2015/0199147 A1 Jul. 16, 2015

(51) Int. Cl.
  *G06F 3/06* (2006.01)

(52) U.S. Cl.
  CPC .............. *G06F 3/0644* (2013.01); *G06F 3/067* (2013.01); *G06F 3/0608* (2013.01); *G06F 2003/0695* (2013.01)

(58) Field of Classification Search
  CPC ..... G06F 3/067; G06F 3/0608; G06F 3/0644; G06F 2003/0695
  USPC ........................................................ 711/170
  See application file for complete search history.

(56) References Cited

U.S. PATENT DOCUMENTS

| | | | |
|---|---|---|---|
| 6,510,505 B1 | 1/2003 | Burns et al. | |
| 7,587,568 B2 | 9/2009 | Muthulingam et al. | |
| 7,603,532 B2 | 10/2009 | Rajan et al. | |
| 7,873,782 B2 | 1/2011 | Terry et al. | |
| 8,086,652 B1 * | 12/2011 | Bisson et al. | 707/823 |
| 2013/0151754 A1 | 6/2013 | Khmelnitsky et al. | |

OTHER PUBLICATIONS

Bertrand Dufranse, et al., "IBM XIV Storage System Thin Provisioning and Space Reclamation," Jun. 2013.

* cited by examiner

*Primary Examiner* — Jasmine Song
(74) *Attorney, Agent, or Firm* — Matthew C. Zehrer

(57) ABSTRACT

A storage system includes a plurality of storage modules. Each storage module may be interconnected by a module interconnect switch and may include a memory, a central processing unit, a cache, and a plurality of storage devices. Storage space may be reclaimed in the storage system by a storage module requesting a copy of a file system bitmap, receiving a request to write data to a partition of the storage module, updating a write table to indicate the partition write, querying the copy of the file system bitmap and the write table to determine if the partition has been written to and if the partition may be reclaimed, and reclaiming the partition for subsequent reallocation and reuse.

14 Claims, 5 Drawing Sheets

STORAGE THIN PROVISIONING AND SPACE RECLAMATION

FIELD

Embodiments of invention generally relate to storage thin provisioning and space reclamation.

DESCRIPTION OF THE RELATED ART

A data storage system administrator or user may overestimate his or her storage needs and purchase a storage system that may handle a maximum anticipated storage load, even if the maximum load may only be expected for a short period of time. Because there may be unutilized storage space in normal operation, this practice may lead to inefficient storage system utilization.

Thin provisioning is becoming a widely accepted practice for data storage allocation. Thin provisioning is the practice of providing virtual capacity to a logical volume (logical unit number, or LUN) and passing that LUN to a host server. The host sees the full capacity of the LUN when, in fact, the LUN is only backed with partial capacity, or the capacity is dynamically allocated as data is written. In this way, thin provisioning provides significant improvements in data storage efficiency by overcoming the inefficiency of hosts only partially using the capacity of the LUNs assigned to them.

After a host writes to a thin-provisioned volume, physical capacity is allocated to the host file system. Unfortunately, if the host deletes the file, only the host file system frees up that space. The physical capacity of the storage system remains unchanged. In other words, the storage system does not free up the capacity from the deleted host file. This is commonly referred to as dead space.

Current processes of reclaiming dead space are typically achieved by invoking the Small Computer System Interface (SCSI) WRITE SAME or the SCSI UNMAP command. These SCSI primitive commands have different characteristics and can vary in the amount of capacity that can be reclaimed.

The WRITE SAME command can be used to reclaim unused capacity by writing zeros to the partitions whereby the storage system is then able to mark these partitions as unused as part of normal scrubbing processes. WRITE SAME processes take a relatively long time and new processes were called for. Therefore, the T10 Technical Committee established the T10 SCSI Block Command 3 (SBC3) specification that defines the UNMAP command for a diverse spectrum of storage devices including hard disk drives and numerous other storage media. Using SCSI UNMAP, storage administrators can reclaim host file system space and back-end storage dead space. The UNMAP command is invoked by a file system side client and is the only entity to know the actual dead space that is subject to the command and thus can be returned to the storage.

SUMMARY

In a first embodiment of the present invention, a storage system includes a plurality of storage modules and a method for storage space reclamation the storage system includes: requesting, with a storage module, a copy of a file system bitmap; receiving, with the storage module, a request to write data to a partition of the storage module; updating, with the storage module, a write table to indicate the partition write; querying, with the storage module, the copy of the file system bitmap and the write table to determine if the partition has been written to and if the partition may be reclaimed, and; reclaiming, with the storage module, the partition for subsequent reallocation and reuse.

In another embodiment of the present invention, a computer program product for storage space reclamation in the storage system includes a computer readable storage medium having program code embodied therewith, the program code executable to: request, with a storage module, a copy of a file system bitmap; receive, with the storage module, a request to write data to a partition of the storage module; update, with the storage module, a write table to indicate the partition write; query, with the storage module, the copy of the file system bitmap and the write table to determine if the partition has been written to and if the partition may be reclaimed, and; reclaim, with the storage module, the partition for subsequent reallocation and reuse.

In yet another embodiment of the present invention, a storage system includes a plurality of storage modules, each storage module configured to: request a copy of a file system bitmap; receive a request to write data to a partition of the storage module; update a write table to indicate the partition write; query the copy of the file system bitmap and the write table to determine if the partition has been written to and if the partition may be reclaimed, and; reclaim the partition for subsequent reallocation and reuse. In certain embodiments, each of the plurality of storage modules includes a memory, a central processing unit, a cache, and a plurality of storage devices. Further in certain embodiments, the storage modules are interconnected by a module interconnect switch. In certain embodiments, each of the plurality of storage modules is an interface module or a data module.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
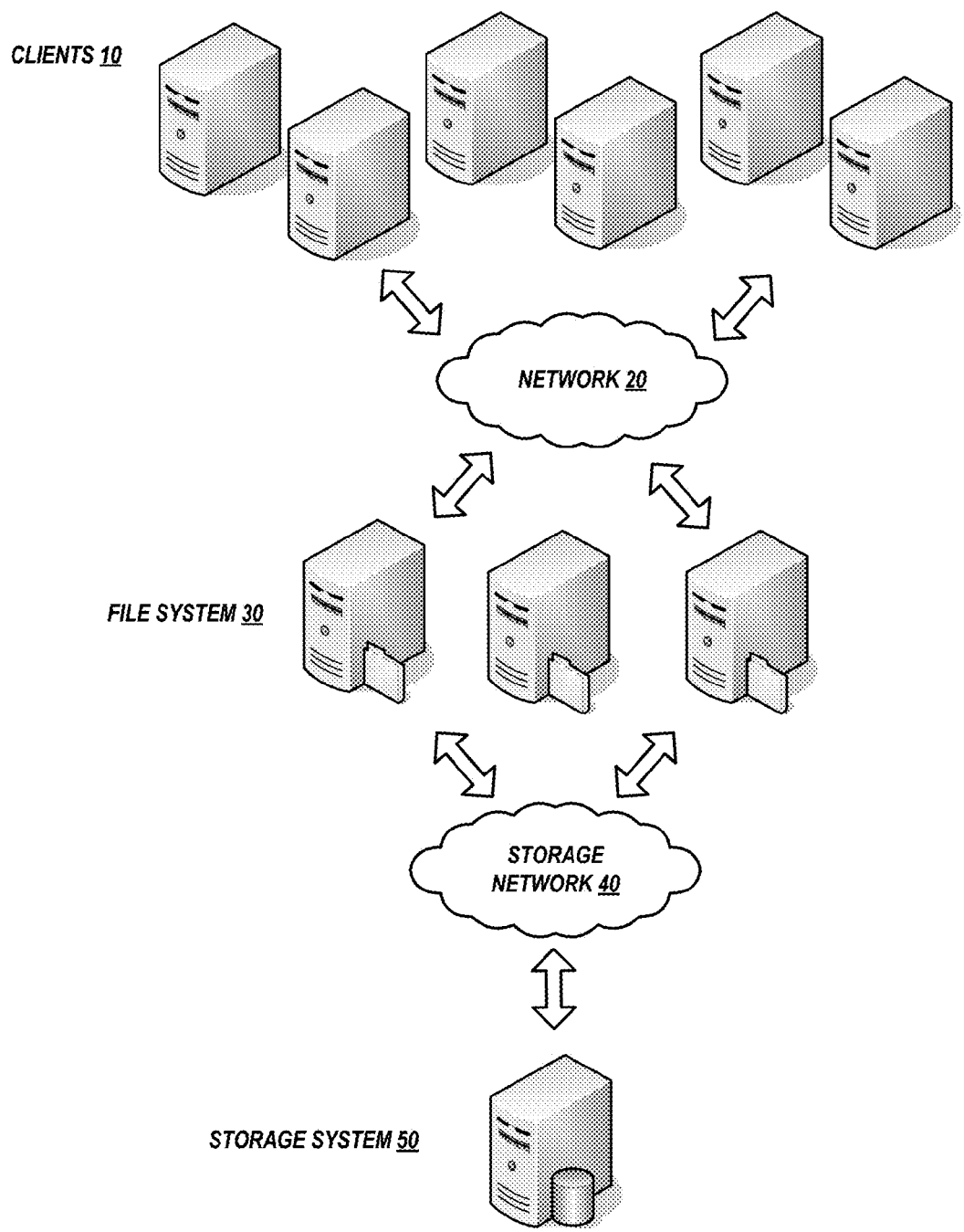
FIG. 1 depicts an exemplary a thin provisioned storage system environment, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts an exemplary thin provisioned storage system environment that may include one or more clients 10 attached to a file system or file system cluster, herein referred to collectively as file system 30, via network 30. File system 30 may be connected to a storage system 50 via a storage network 40. Client 10 may be for example, a server, a computer, a workstation, etc. A group of clients 10 may be logically grouped to for a client cluster. Generally, client 10 may access a service from file system 30 via e.g. network 20, etc. and may transfer data from or to other network components. Network 20 may be a computer network, data network, a telecommunications network, etc. that allows the transfer of data from clients 10. For example, network 20 may be a Token Ring network, Ethernet, wide are network (WAN), local area network (LAN), internet, etc. Generally, file system 30 controls how data is stored and retrieved to or from storage system 50. Storage Network 40 may be a network that allows for the transfer of data to storage system 50 and may be a storage area network (SAN), network attached storage (NAS) network, Fibre Channel network, SSA network, Serial SCSI network, Infiniband network, FDDI network, ATM network, 1394 network, ESCON network, etc. Storage system 50 stores data as requested by network components and allows for subsequent data retrieval. In certain embodiments, storage system 50 may be a storage server, a grid storage system, etc.

Figure 2:
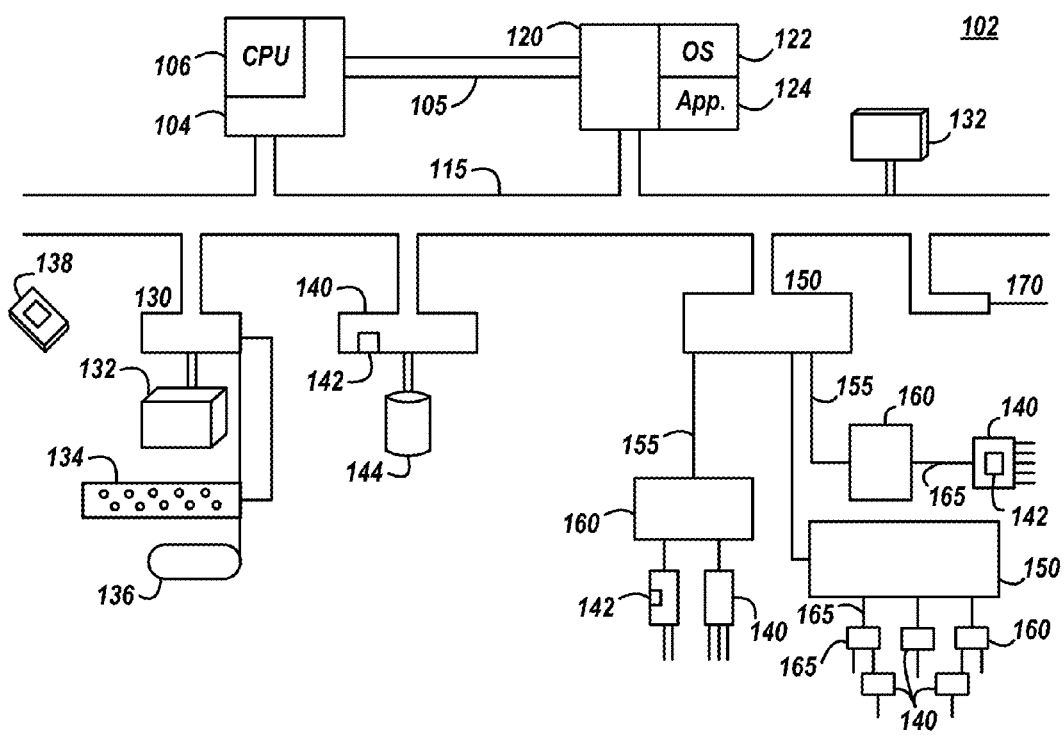
FIG. 2 depicts a block diagram of exemplary components of one or more devices of a storage system network, according to various embodiments of the present invention.

FIG. 2 depicts a block diagram of exemplary components of one or more devices of a storage system network, according to various embodiments of the present invention. The exemplary components of FIG. 2 may form an interconnection topology for an information handling system (IHS) 100, for example, a client 10 device, a file system, storage system 50, etc. IHS 100 may comprise a host 102 having a host processor complex 104 connected to a memory 120 by an internal bus 105 and/or a host system bus 115. The host processor complex 104 may include at least one general-purpose programmable processor unit (CPU) 106 that executes program instructions stored in main memory 120. Although a single CPU 106 is shown in FIG. 2, it should be understood that a processor complex 104 may have multiple CPUs 106.

Memory 120 or a portion of memory 120 may be physically included within the host processor complex 104 or connected to it via an internal bus system 105 or via a host system bus 115. Memory 120 may be for example a random access semiconductor memory for storing data and/or program instructions. Though memory 120 is shown conceptually as a single monolithic entity, memory 120 may be arranged as a hierarchy of caches and other memory devices. In some instances, a hierarchy of cache memories is associated with each CPU 106. Memory 120 includes operating system (OS) 122 and applications 124. OS 122 may provide functions such as device drivers or interfaces, management of memory pages, management of multiple tasks, etc., as is known in the art. Applications 124 may provide IHS 100 increased computational functionality. For example, applications 124 may include a server software application whereby a network interface 170 may interact with the server software application(s) to enable IHS 100 to be a network server, may include a file system software application(s) whereby the network interface 170 may interact with the file system software application(s) to enable IHS 100 to be a network file system, may include a storage software application whereby the network interface 170 may interact with the storage software application to enable IHS 100 to be a network storage system, etc.

Host system bus 115 may support the transfer of data, commands, and other information between the host processor system 102 and peripheral or external devices attached to it, and communication of data which may occur between the external devices independent of the host processor complex 102. While shown in simplified form as a single bus, the host system bus 115 may be structured as multiple buses which may be for example hierarchically arranged. Host system bus 115 may be connected to other internal host 102 components (such as a touch screen, display 132, touch pad, etc.) and/or to a myriad of external or peripheral devices through a connection hub 130, through an adapter 140, a multifunction adapter 150, or directly to a network 170.

These peripheral devices may include a monitor or display 132, a keyboard 134, a mouse or other handheld device 136, and/or a printer 138. Display 132 may be a cathode-ray tube display, a flat panel display, or a touch screen, or other display technology. One or more adapters 140 may support keyboard 134 and mouse 136; it being understood that other forms of input devices could be used. The number and types of devices shown in FIG. 2 are illustrative only and ordinary users of computer systems now know that a great variety of connected devices exist; e.g., microphones, speakers, infrared remote controls, wireless connected devices, etc. and therefore IHS 100 is not limited to those devices illustrated in FIG. 2.

The host system bus 115 may also be connected to an adapter 140 (e.g. an I/O adapter connected to a memory device 144). Memory device 144 may be rotating magnetic disk storage, rotating or static optical drives, magnetic tape storage, FLASH memory, etc. Adapter 140 may include adapter microcode or firmware and decision logic which may be embodied as a message processor 142. The adapter 140 may also be provided with at least one fast nonvolatile write cache, queues, interrupt registers connected to the message processor 142 and/or decision logic. The message processor 142 may process incoming messages from the host processor complex 102 and generate and transmit response messages back to the host processor complex 102.

An adapter 140 may contain electronic components and logic to adapt or convert data of one protocol on one bus to another protocol on another bus. Therefore, adapters 140 may connect a wide variety of devices to the host computer system 102 and to each other such as, but not limited to, tape drives, optical drives, printers, disk controllers, other bus adapters, PCI adapters, other IHSs 100, etc. using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, SAN connections, NAS connections, high performance graphics, etc.

The host system bus 115 may also be connected to a multifunction adapter 150 to which more I/O devices may be connected either directly, or through one or more bridge devices 160, or through another multifunction adapter 150 on either a primary bus 155 or a secondary bus 165. Various components may be connected to the primary bus 155 including, for example, an adapter 140, a bridge device 160, or another multifunction I/O processor or a multifunction adapter 150. The bridge device 160 bridges the primary bus 155 and a secondary bus 165 to which various adapters 140 may be connected. The adapters 140, the primary bus 155, and the secondary bus 165 may conform to the PCI/PCI-X or other industry bus specification. One skilled in the art realizes, however, that the implementation is not limited to a PCI/PCI-X or a SCSI or USB bus implementation but is applicable to any electrical, optical, or wireless bus where data must be efficiently transferred.

Network interface 170 provides an operative connection for transmission of data to and from a network. The network may be an internet but could also be any smaller self-contained network such as an intranet, a WAN, a LAN, or other internal or external network using; e.g., telephone transmission lines, cable services, satellites, fiber optics, Ti lines, wireless, etc., and any other various technologies.

Finally, IHS 100 need not be a computer at all, but may be a simpler appliance-like client device with less memory such as a network terminal, a thin client, a terminal-like device, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smart phones, pagers, simple messaging devices, and wearable devices. Thus when the IHS 100 is a mobile device, the adapters 140 and network interfaces 170 support a variety of multi-modal interfaces including traditional keyboard and mouse interfaces, small text screens, pen, touch screens, speech recognition, text-to-speech, and/or wearable devices.

The computer system shown in FIG. 2 is intended to be a simplified representation, it being understood that many variations in system configuration are possible in addition to those specifically mentioned here. While IHS 100 could conceivably be a personal computer system, the IHS 100 may also be a larger computer system such as a general purpose server. IHS 100 and its components are shown and described in FIG. 2 above as a more or less single, self-contained computer system. It is alternatively possible to use multiple modular computer systems that may share a single large database, etc.

Various embodiments of the present invention pertain to methods that may be implemented upon or by IHS 100, components of HIS 100, etc. When IHS 100 performs particular as directed from the program instructions stored in memory 120, such IHS 100 in effect becomes a special purpose machine particular to the various methods as described further herein.

After a host writes to a thin-provisioned volume, physical capacity is allocated to the host file system. Unfortunately, if the host deletes the file, only the host file system frees up that space. The physical capacity of the storage system remains unchanged. In other words, the storage system does not free up the capacity from the deleted host file. This is commonly referred to as dead space.

The current processes of reclaiming dead space are typically achieved by invoking the SCSI WRITE SAME or the UNMAP command. A problem with either of the techniques is that the storage system network device that is affected by dead space and a potential shortage of free space is the storage system which does not control when and how to reclaim such dead space. Rather, the storage system is at the mercy of the file system to implement such reclamation processes. Further, the file system can unmap some or all of storage blocks of the file system, yet those blocks might not be usable to an underlying storage device of the storage system due to not fitting the storage system architecture and minimum storage granularity. One may mitigate such problem by demanding the storage device and the file system share the same block size to squash the need to translate a file system device logical block address with a storage system device logical block address.

Further, in a thin provisioned storage environment, because data blocks may be allocated or assigned as needed by the file system it is possible that some logical groups of data blocks can occasionally/temporarily be more used (e.g. more data exists on certain part of the storage compared to other parts, data is not evenly distributed across the storage array, etc.) than other logical groups. In certain embodiments, the most populated logical group may determine the usage level of the entire storage system. The file system can unmap many of its freed blocks, however if the freed blocks do not belong to the most used logical group, the file system unmapping may not alleviate a shortage of free data blocks of a space starved storage system, because its most used logical group may be fully utilized.

As such, it is an object of various embodiments of the present invention, for storage system 50 to control or implement the reclamation processes, whereby the storage system 50 may direct reclamation processes to the busiest slices first and foremost and, generally, need not treat all partitions similarly. In the various embodiments of the present invention, storage system 50 implements a grid architecture. One such example of such storage system 50 is the IBM® XIV® Storage System. Storage system 50 may comprise a plurality of storage devices. The storage devices may be, for example, hard drives, tape drives, flash memory drives, etc. The smallest data block for storing data within storage system 50 may be referred to a partition. In certain embodiments, the storage size of a partition may be e.g. 1 MB, 2 MB, etc. Partitions may be grouped in to slices. In various embodiments, storage system 50 may includes multiple LUNs. In certain implementations, each LUN may be spread across all of the slices. In specific embodiment, the minimum size of a LUN is about 17 GB and, may grow or shrinks in 17 GB granularity.

Further in a file system managed thin provisioning in the specific embodiment utilizing an XIV storage system may occur in association with the XIV snapshot function. A snapshot represents a point-in-time copy of a LUN. Snapshots are like LUNs, except snapshots incorporate dependent relationships with their source LUN, which can be either LUNs or other snapshots. Because they are not independent entities, a given snapshot does not necessarily wholly consist of partitions that are unique to that snapshot. Each snapshot resides on the same slice as its master. When many snapshots are taken of a LUN on which the write activity is geared toward a small number of partitions, their respective slices will become increasingly active. Therefore, an XIV can have many partitions free but if even one of its slices has used all of its partitions, the entire XIV is considered fully utilized and no new LUN can be created on it. In such circumstances when free partitions are urgently needed by the XIV, an unmap process driven by the file system which is unaware of the XIV internal architecture is not likely to give a timely and satisfactory result. Again, it is therefore an object of various embodiments of the present invention, for a storage system 50, such as an XIV storage system, to control or implement the reclamation processes. Therefore, certain embodiments of the present invention give storage system 50 control of what blocks and/or partitions are reclaimed so that the reclamation does not depend on e.g. a file system assumption that data is evenly distributed across the storage devices of the storage system 50.

In certain embodiments, file system 30 may be a clustered parallel file system which allows multiple clients to concurrently read or write access to file system 30. In certain embodiments, file system 30 may be an IBM General Parallel File System (GPFS). Data that is written to the file system 20 may be broken up into blocks of a configured size, e.g. less than 1 megabyte each. File system 30 may manage physical or virtual disks and may stripe its file system across all storage devices under management to improve performance, etc. In order to allow for each individual file system device in the file system cluster to manage, in parallel, part of the total storage space without interlocking with other file system devices, each file system device is given its own data chunk which is spread across all storage devices under management of the particular file system device. If one file system device goes down, its resources can be recovered by other file system devices within the cluster since all file system devices within the cluster may have access to the entire storage pool and be managed by a newly elected file system device. This may result in high reading and writing speeds for a single file, as the combined bandwidth of the managed storage is high. To prevent data loss, file system 30 may include or utilize downstream RAID controllers, etc.

File system 30 may provide concurrent high-speed file access to applications executing on multiple clients 10. For example, it may support AIX clients 10, Linux clients 10, Microsoft® Windows® clients 10, or heterogeneous client 10 clusters, etc.

In various embodiments, file system 30 may provide online storage management, scalable access, and integrated information life-cycle management applications capable of managing petabytes of data and e.g. billions of files. File system 30 may virtualize its storage under management allowing multiple systems and applications to e.g. share common pools of storage. File system 30 may utilize upper-level network protocols to connect to storage system 50 such as, e.g. IP over InfiniBand (IPoIB), Socket Direct Protocol (SRP), SCSI RDMA Protocol (SDP), iSCSI Extensions for RDMA (iSER), Network Shared Disk (NSD) communication using Remote Direct Memory Access (RDMA).

File system 30 may include a bitmap to keep track of the write operations. Generally, the bitmap indicates what areas of the storage are allocated. For example, a value of each bit in the bitmap may represent whether a unit of storage, e.g., a block, is free. A bit value of "1" in a free space bitmaps may indicate that the block associated with the bit is free, and a value of "0" may indicate that the block is not free. Of course, other bitmaps may logically reverse the free/not free values. The bitmap may utilize two-way addressing, meaning that the block address of managed space can be used to locate the corresponding bit address in the bitmap and vice-versa. Moreover, the bitmap may be self organizing, in that searching for a range of storage is localized to the respective bits in the bitmap that represent the range of storage. Still further, the bitmap may be parallel.

Figure 3:
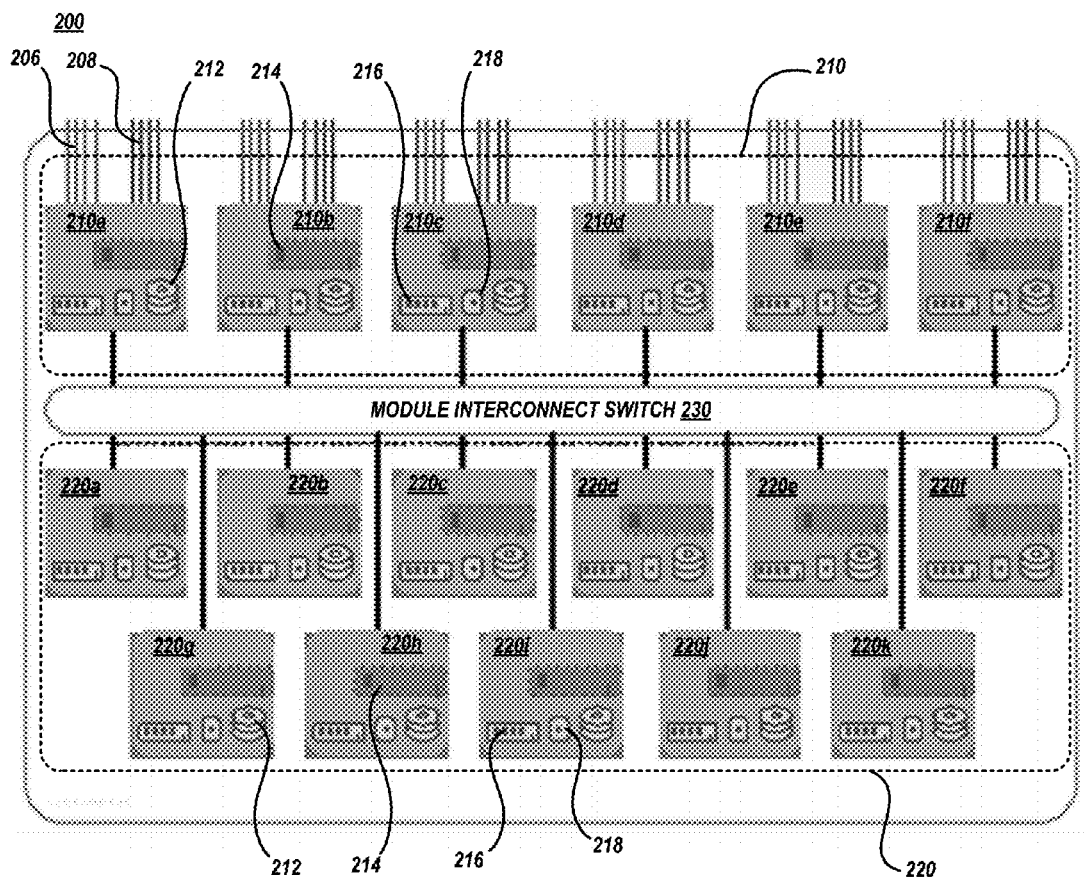
FIG. 3 depicts a block diagram of exemplary components of a grid storage system, according to various embodiments of the present invention.

FIG. 3 depicts a block diagram of exemplary components of grid storage system 200, according to various embodiments of the present invention. Grid storage system 200 may be a disk storage server designed to provide consistent and predictable performance, high availability, ease of use, etc. Grid storage system 200 may include a plurality of modules. Each module may be an independent information handling system laid out in a grid. In certain embodiments grid storage system 200 may include homogeneous modules. For example, grid storage system 200 may include one or more interface modules 210 and one or more data modules 220. Interface modules 210 may be similar to data modules 220, but also includes a host interface for data communication with a host (e.g. file system 30, clients 10, etc.). In other embodiments, grid storage system 200 may include only interface modules 220, etc. Interface modules 210 and data modules 220 may be connected together in parallel by module interconnect switch 230 using InfiniBand connections, Ethernet connections, etc.

Grid storage system 200 may distribute volumes across all included modules in small (e.g. 1 MB, 2 MB, etc.) partitions to utilize the modules' resources evenly. For robustness, each partition may be stored in at least two copies on separate modules, so that if a part of a storage device, an entire storage device, or an entire module fails, the data is still available. Grid storage system 200 capacity may be increased by e.g. adding additional modules. When an additional module is added, grid storage system 200 may redistribute the previously stored data to make optimal use of its increased capacity.

In certain embodiments, grid storage system 200 includes data modules 210, interface modules 220, interconnect switches 230, one or more uninterruptible power supply units, etc. Data module 210 provides storage capacity, processing power, and caching, in addition to system management services. In addition to disk, cache, and processing resources, interface modules may include Fibre Channel interfaces 206 and/or iSCSI interfaces 208 for data communication with one or more hosts, remote mirroring, and data migration activities, etc. In certain embodiments each module may include one or more storage devices 212 (e.g. hard drives, flash memory drives, etc.), one or more cache memory devices 214 (e.g. DRAM, Flash memory, etc.), one or more memory devices 216, and one or more CPUs 218, etc.

Grid storage system 200 may include a module interconnect switch 230 that transmits both data and metadata traffic between the modules. Data traffic can flow between two interface modules 210, between two data modules 220, between an interface module 210 and a data module 220, etc.

Figure 4:
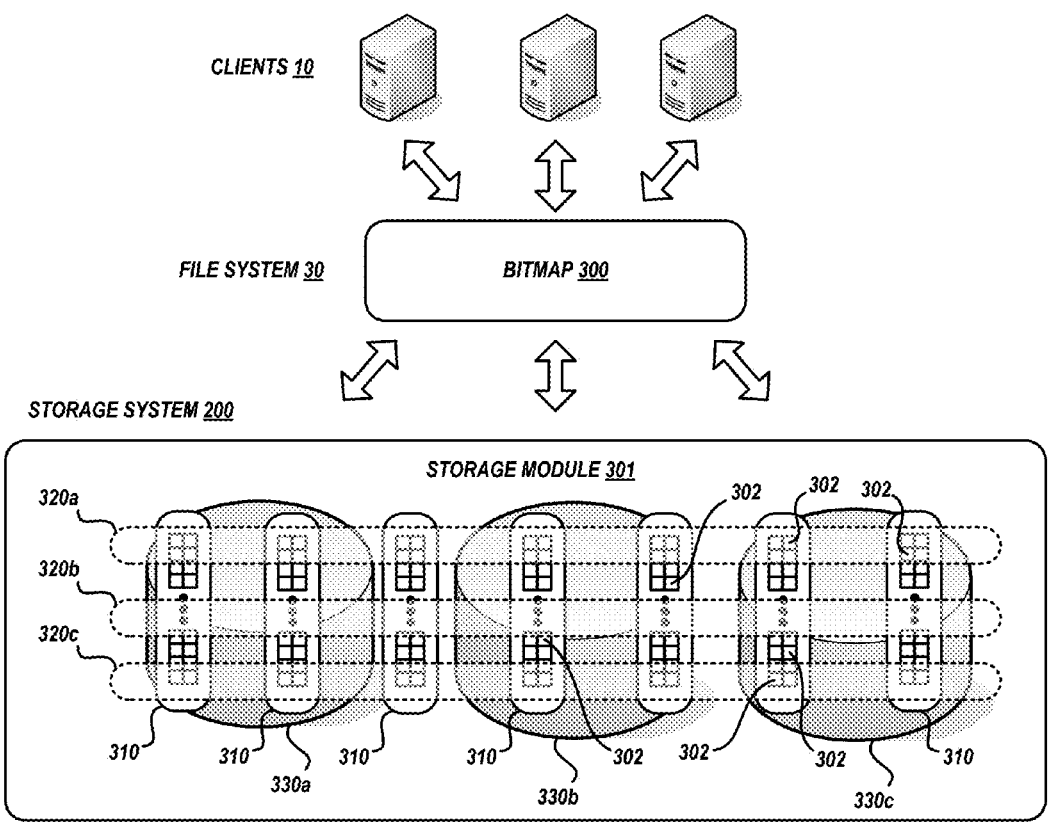
FIG. 4 depicts an exemplary bitmap that maps between various devices within the storage environment to allow for networked storage, according to various embodiments of the present invention.

FIG. 4 depicts bitmap 300 that maps between various devices within the storage environment to allow for networked storage, according to various embodiments of the present invention. In various embodiments, bitmap 300 maps respective file system 30 blocks to partitions 302 of one or more storage modules 301 (e.g. interface module 210, data module 220, etc.). In certain embodiments, the bitmap 300 is passed to storage system 50, grid storage system 200, etc. so that the storage system may utilize the bitmap information to determine and manage reclamation of dead space.

Each module 301 may include numerous partitions 302 which are the smallest data blocks for storing data. Partitions may be grouped into slices 310. In certain embodiments, slice 310 size can grow or shrink when new disks are added or removed from the system and the size of a slice 310 may be calculated by dividing the total storage size by the number of slices. For example grid storage system 200 may include 180 one terabyte disks wherein each slice 310 is in the order of 10 GB each. In various embodiments, module 301 may includes multiple LUNs 320. In certain implementations, every LUN 320 is spread across all of the slices 310 and all of the storage devices 330 (e.g. hard drives, FLASH memory drives, tape drives, etc.). In certain embodiments a particular LUN 320a may be assigned to a particular host (e.g. particular file system 30 device, particular client 10, etc.).

In various embodiments bitmap 300 tracks the file system storage space that has been used (e.g. written to, etc.) and/or the file system storage space that is free (e.g. have not been written to, etc.). Deleted files are returned to file system free space as reflected in the bitmap but storage system is not aware of the returned space and from the perspective of storage system the space is still used. Therefore, in accordance with the various embodiments of the present invention, the storage system may update its own internal partitions map, structures, etc. and prioritize which partitions are checked, updated, or reclaimed. In various embodiments, each storage module 301 maintains its own partition table. In certain embodiments, this partition level reclamation technique does not require a full reclamation of all free blocks. Rather, partition level reclamation may stop the reclamation processes once a sought after number of free partitions are created (e.g. enough partitions to create and allocate a new LUN, etc.).

Current reclamation practices that involve modules require that all freed partitions are evenly redistributed back to the grid storage system as it is assumed by the grid storage system that all slices are more or less evenly used or freed by the file system. In contrast, the various embodiments of the present invention allow for each of the modules 301 to independently decide whether the module 301 should or need to reclaim dead space from the storage space assigned to it by the file system 30. An advantage of such reclamation technique is the effective balancing of the freed partitions across all slices to keep reclamation overhead to a minimum.

In various embodiments, each module 301 tracks which partitions 302 to which it writes. Initially, this tracking may be done in the local partition table of each module 301. In other embodiments, this tracking may be accomplished by a write table that tracks which partitions 302 data is written. For instance a bit is activated in the write table in an entry associated with a partition 302 prior to module 301 writing data thereto, etc. In certain embodiments, the write table may be stored in the local cache 214, memory 216 of the module 301. The write table may be created at system startup, and may further contain a mapping of every partition 302, and the module 301 and physical storage device 330 where they are located. When hardware changes occur, a new write table may be created. A particular module 301 may include a local write table that differs from a local write table of another module 301. Further, a copy of a particular write table for a particular module 301 may be stored in another module 301 for added redundancy.

Subsequently, the module 301 may request and receive the bitmap 300 from file system 30. When the bitmap is available, the module 301 may migrate its partition table, write table, etc. with the information of the received bitmap 300. The module 301 may then utilize the merged map (e.g. partition table, write table, bitmap, etc.) for subsequent reclamation processes.

By the storage system requesting and receiving bitmap 300, the file system 30 and the storage system can be loosely coupled in that the storage system need not be in constant communication with file system 30 once it has received the copy of bitmap 300. Though the requested and received bitmap 300 can become stale or obsolete subsequent to the receipt by the storage system, the storage system being in control of write requests, etc., may use its own meta data, write map, partition map, etc. along with bitmap 300 to determine what storage system storage space is free or what storage system storage space is used. When bitmap 300 lacks adequate information in that it is not useful in this determination by the storage system, a new copy of bitmap 300 can be requested and retrieved. The storage system alone may decide when and if it needs a new more up to date bitmap 300.

In certain embodiments, module 301 marks a respective bit entry in the merged map for subsequent writes. Thus, each of the modules 301 may independently utilize its local merged map in their own reclamation processes since the merged map will have the correct status of a used partition 302 and, it can safely update and reclaim it's partitions 302, partition 302 structure, etc. In certain embodiments, each module 301 may request a more recent copy of bitmap 300 to learn of new free blocks that may have been freed since the previous merge of bitmap 300.

The logical structure of the storage system (e.g. grid storage system 200) may provide granularity in the bitmapping from file system 30 and the mapping of logical elements to modules 301 and individual physical storage devices 330. A partition 302 may be mapped to a single physical storage device 330. This mapping is dynamically managed by the storage system 200. In certain embodiments, the allocation mapping of the partitions 302 may occur in bitmap 300 at the file system 30 level.

The storage system 200 may present particular LUNs 320 to particular hosts. A LUN 320 consists of multiple partitions 302. Storage system 200 may manage the distribution of LUNS 320 over physical storage devices 330 with a dynamic relationship between partitions 302 and physical storage devices 330. This virtualization of resources within storage system 200 may be managed by the data distribution algorithms.

Figure 5:
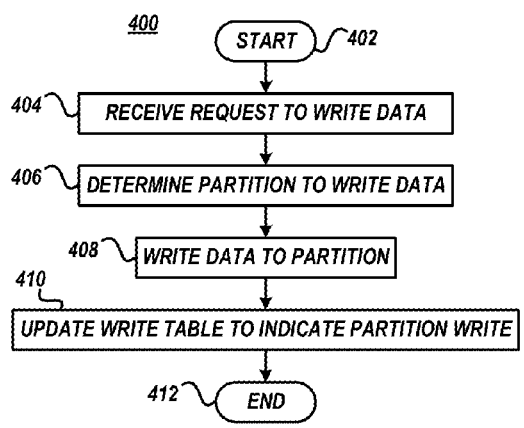
FIG. 5 depicts a flow diagram of an exemplary write tracking method, according to various embodiments of the present invention.

FIG. 5 depicts a flow diagram of an exemplary write tracking method 400, according to various embodiments of the present invention. Method 400 begins at block 402 and continues with a storage module 301 receiving a request to write data from a host (block 404). For example, storage module 301 may receive a request to write data from file system 30, client 10, etc. Storage module 301 determines which partitions to write data (block 406). In certain embodiments, storage module 301 is instructed which partitions to which it should write data from e.g. file system 30, etc. Method 400 continues with storage module 301 writing the data to the determined partition (block 408) and updating it's local write table (block 410). For example, the storage module may query its local partition table, write table, etc. to find an entry associated with the determined partition and indicate in the entry that the partition has been written to. In certain implementations, a bit may be set to indicate that the determined partition has been written to. Method 400 ends at block 412.

Figure 6:
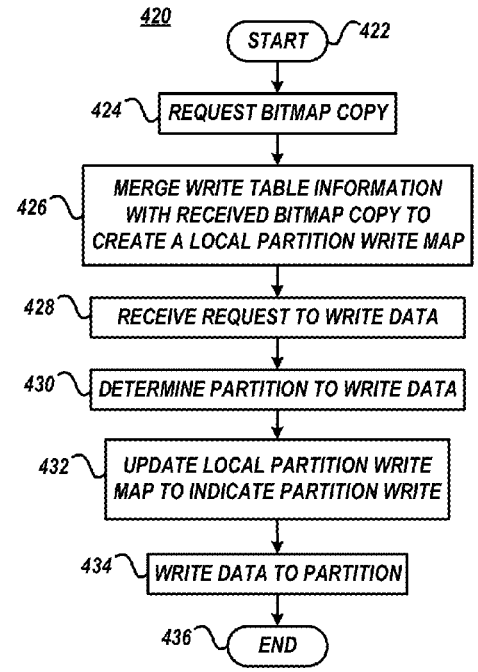
FIG. 6 depicts a flow diagram of an exemplary bitmap merge method, according to various embodiments of the present invention.

FIG. 6 depicts a flow diagram of an exemplary bitmap merge method 420, according to various embodiments of the present invention. Method 420 begins at block 422 and continues with storage module 301 requesting a copy of bitmap 300 from file system 30 (block 424). For example, a particular storage module 301 requests a copy of the entire bitmap 300. In certain other embodiments, storage module 301 requests a copy of a portion of bitmap 300. For example, a particular storage module 301 may request the portion of bitmap 300 that is applicable only to the particular storage module 301.

Method 420 continues with storage module 301 receiving bitmap 300 and merging it's local partition table, write table, etc. with the received bitmap 300 to create a local partition write map (block 426). The local partition write map may track whether particular partitions 302 of a storage module 301 have been written to. Method 420 continues with storage module 301 receiving a request to write data from a host (block 428). Storage module 301 determines which partitions to write data (block 430). Method 420 continues with storage system 301 updating it's local partition write map to indicate the partition write (block 432). For example, the storage module may query its local partition write map to find an entry associated with the determined partition and indicate in the entry that the partition has been or will be written. Method 420 continues with storage module 301 writing the data to the determined partition (block 434). Method 420 may be utilized by storage system 200 to allow for each module 301 to manage and control the reclamation of partitions 302 by giving each module 301 the ability to determine which partitions 302 have been written to. Method 420 ends at block 436.

Figure 7:
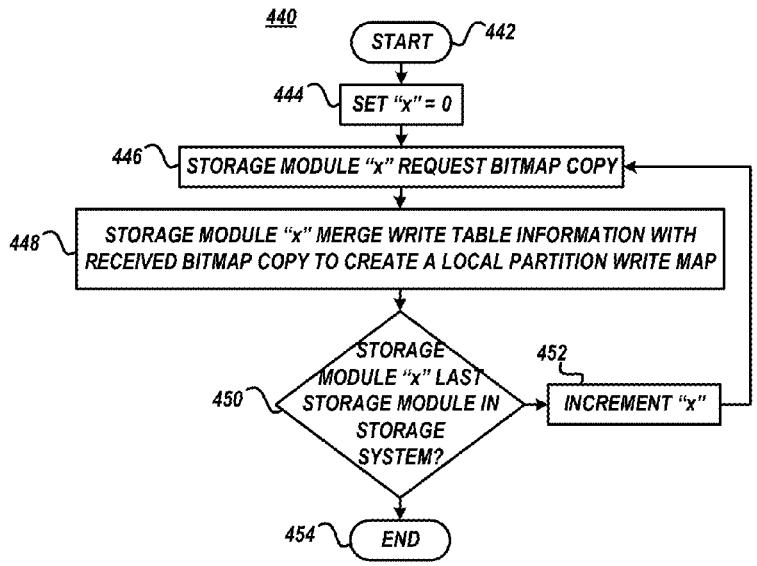
FIG. 7 depicts a flow diagram of an exemplary grid storage system bitmap merge method, according to various embodiment of the present invention.

FIG. 7 depicts a flow diagram of an exemplary grid storage system 200 bitmap merge method 440, according to various embodiment of the present invention. Method 440 beings at block 442 and continues with grid storage system 200 setting a variable "x" equal to zero or at an arbitrary reference variable (block 444). For example, a grid storage system 200 management application may set the variable "x" equal to zero within a management routine, etc.

Method 440 continues with module 301 "x" requesting a copy of bitmap 300 from file system 30 (block 446). For example, a first module 301 of grid storage system 200 requests a copy of bitmap 300 from file system 30. Method 440 continues with storage module "x" merging it's local partition table, write table, etc. with the received bitmap 300 to create a local partition write map (block 448).

Method 440 continues with grid storage system 200 determining whether storage module "x" is a last storage module 301 within storage system 200 (block 450). If the determination is affirmative, method 440 ends at block 454. If storage module "x" is not the last storage module 301, storage system 200 increments the variable "x," and method 440 returns to block 446. Method 440 may be utilized by storage system 200 to allow for each module 301 to manage and control the reclamation of partitions 302 by giving each module 301 the ability to determine which partitions 302 have been written to.

The drawings are not necessarily to scale. The drawings are merely schematic representations, not intended to portray specific parameters of the invention. The drawings are intended to depict only exemplary embodiments of the invention. In the drawings, like numbering represents like elements.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for storage space reclamation in a storage system comprising a plurality of storage modules, the method comprising:
   requesting, with a storage module, a copy of a file system bitmap from the file system, the file system bitmap managed by the file system and maps the file system blocks to partitions within the plurality of storage modules;
   storing, with the storage module, the copy of the file system bitmap within the storage module;
   merging, with the storage module, a write table with the copy of the file system bitmap to form a local partition write map (LPWM), the write table managed by the storage module and tracks storage module writes to partitions of the storage module, the write table unique to the storage module relative to write tables managed by the other plurality of storage modules;
   receiving, with the storage module, a request to write data to a first partition of the storage module;
   updating, with the storage module, the LPWM by activating a write bit in a LPWM entry associated with the first partition;
   querying, with the storage module, the LPWM to determine if a second partition has been written to and if the second partition may be reclaimed, wherein querying the LPWM comprises determining if a write bit in a LPWM entry associated with the second partition is active, and;
   reclaiming, with the storage module, the second partition for reallocation and reuse if the second partition has not been written to;
   wherein each of the plurality of storage modules comprise a memory, a central processing unit, a cache, and a plurality of storage devices and wherein each of the storage modules are interconnected by a module interconnect switch.

2. The method of claim 1, further comprising:
   maintaining, with the storage module, the write table prior to requesting the copy of the file system bitmap.

3. The method of claim 1, further comprising:
   determining, with the storage system, whether each of the storage modules have requested a copy of the file system bitmap, and;
   instructing, with the storage system, the storage modules that do not comprise the copy of the file system bitmap to request the copy of the file system bitmap.

4. The method of claim 1, wherein requesting the copy of a file system bitmap further comprises:
   requesting, by each of the plurality of storage modules, a current copy of the bitmap on as needed basis for independently determining which partitions have been written to and may be reclaimed.

5. The method of claim 1 wherein the storage module is an interface module or a data module.

6. A computer program product for storage space reclamation in a storage system comprising a plurality of storage modules, the computer program product comprising a non-transitory computer readable storage medium having program code embodied therewith, the program code executable to:
   request, with a storage module, a copy of a file system bitmap from the file system, the file system bitmap managed by the file system and maps the file system blocks to partitions within the plurality of storage modules;
   store, with the storage module, the copy of the file system bitmap within the storage module;
   merge, with the storage module, a write table with the copy of the file system bitmap to form a logical partition write map (LPWM), the write table managed by the storage module and tracks storage module writes to partitions of the storage module, the write table unique to the storage module relative to write tables managed by the other plurality of storage modules;
   receive, with the storage module, a request to write data to a first partition of the storage module;
   update, with the storage module, the LPWM by activating a write bit in a LPWM entry associated with the first partition;
   query, with the storage module, the LPWM to determine if a second partition has been written to and if the second partition may be reclaimed, wherein the query of the LPWM comprises determining if a write bit in a LPWM entry associated with the second partition is active, and;
   reclaim, with the storage module, the second partition for reallocation and reuse if the second partition has not been written to;
   wherein each of the plurality of storage modules comprise a memory, a central processing unit, a cache, and a plurality of storage devices and are wherein each of the plurality of storage modules are interconnected by a module interconnect switch.

7. The computer program product of claim 6, wherein the program code is further executable to:
   maintain, with the storage module, the write table to track partition writes prior to requesting the copy of the file system bitmap.

8. The computer program product of claim 6, wherein the program code is further executable to:
   determine, with the storage system, whether each of the storage modules have requested a copy of the file system bitmap, and;

instruct, with the storage system, the storage modules that do not comprise the copy of the file system bitmap to request the copy of the file system bitmap.

9. The computer program product of claim 6, wherein the program code is further executable to:
request, by each of the plurality of storage modules, a current copy of the bitmap on as needed basis for independently determining which partitions have been written to and may be reclaimed.

10. The computer program product of claim 6, wherein the storage module is an interface module or a data module.

11. A storage system comprising:
a plurality of storage modules, each of the plurality of storage modules comprise a memory, a central processing unit, a cache, and a plurality of storage devices and are wherein each of the plurality of storage modules are interconnected by a module interconnect switch, each storage module configured to:
request a copy of a file system bitmap from the file system, the file system bitmap managed by the file system and maps the file system blocks to partitions within the plurality of storage modules;
store the copy of the file system bitmap within the storage module;
merge a write table with the copy of the file system bitmap to form a logical partition write map (LPWM), the write table managed by the storage module and tracks storage module writes to partitions of the storage module, the write table unique to the storage module relative to write tables managed by the other plurality of storage modules;
receive a request to write data to a first partition of the storage module;
update the LPWM by activating a write bit in a LPWM entry associated with the first partition;
query the LPWM to determine if a second partition has been written to and if the second partition may be reclaimed, wherein querying the LPWM comprises determining if a write bit in a LPWM entry associated with the second partition is active, and;
reclaim the second partition for reallocation and reuse if the second partition has not been written to.

12. The storage system of claim 11, wherein the storage system is configured to:
determine whether each of the storage modules have requested a copy of the file system bitmap, and;
instruct the storage modules that do not comprise the copy of the file system bitmap to request the copy of the file system bitmap.

13. The storage system of claim 11, wherein each storage module is further configured to:
request a current copy of the bitmap on as needed basis for independently determining which partitions have been written to and may be reclaimed.

14. The storage system of claim 11 wherein each of the plurality of storage modules is an interface module or a data module.

* * * * *